United States Patent
Burke et al.

(10) Patent No.: US 11,157,197 B2
(45) Date of Patent: Oct. 26, 2021

(54) SOCKET INTERCONNECTOR FOR HIGH PAD COUNT MEMORY CARDS

(71) Applicant: WESTERN DIGITAL TECHNOLOGIES, INC., San Jose, CA (US)

(72) Inventors: John Burke, San Jose, CA (US); Hideo Nagasawa, Yamato (JP)

(73) Assignees: Western Digital Technologies, Inc., San Jose, CA (US); Molex LLC, Lisle, IL (US)

(*) Notice: Subject to any disclaimer, the term of this patent is extended or adjusted under 35 U.S.C. 154(b) by 31 days.

(21) Appl. No.: 16/438,945

(22) Filed: Jun. 12, 2019

(65) Prior Publication Data
US 2020/0264802 A1   Aug. 20, 2020

Related U.S. Application Data

(60) Provisional application No. 62/807,395, filed on Feb. 19, 2019.

(51) Int. Cl.
*G06F 3/06* (2006.01)
*G06F 13/16* (2006.01)

(52) U.S. Cl.
CPC .......... *G06F 3/0655* (2013.01); *G06F 3/061* (2013.01); *G06F 3/0679* (2013.01); *G06F 13/1668* (2013.01); *G06F 2213/0026* (2013.01)

(58) Field of Classification Search
CPC .......... G06F 2213/0026; G06F 3/0679; G06F 3/061; G06F 13/1668; G06F 3/0655
(Continued)

(56) References Cited

U.S. PATENT DOCUMENTS 5,667,388 A    9/1997   Cottrell
7,440,287 B1 * 10/2008  Ni ........................ H01R 27/00
                                                      174/50.51
(Continued)

FOREIGN PATENT DOCUMENTS

CN    1505215    6/2004
CN    2788405    6/2006
(Continued)

OTHER PUBLICATIONS

U.S. Appl. No. 16/434,365, filed Jun. 7, 2019.
(Continued)

*Primary Examiner* — Daniel D Tsui
*Assistant Examiner* — Zubair Ahmed
(74) *Attorney, Agent, or Firm* — Vierra Magen Marcus LLP (57) ABSTRACT

A memory card socket interconnector is disclosed including a pair of cavities configured to receive a pair of memory cards. The cavities include patterns of memory card interconnect pads. A second surface of the socket interconnector includes socket interconnect pads, distributed across the second surface of the socket interconnector, which are electrically coupled to the memory card interconnect pads. The memory card socket interconnector may further include an anisotropic elastomeric sheet provided between the memory card pads and the memory card interconnect pads in each cavity to enable good electrical contact between the memory card pads and the memory card interconnect pads.

17 Claims, 9 Drawing Sheets

(58) Field of Classification Search
USPC .......................................................... 711/115
See application file for complete search history.

(56) References Cited

U.S. PATENT DOCUMENTS

| | | | | |
|---|---|---|---|---|
| 2006/0162287 | A1* | 7/2006 | Hasegawa | H01R 11/01 |
| | | | | 53/362 |
| 2009/0004921 | A1* | 1/2009 | Hubert | H01R 31/06 |
| | | | | 439/638 |
| 2010/0025480 | A1* | 2/2010 | Nishizawa | G06K 19/07732 |
| | | | | 235/492 |
| 2017/0125959 | A1* | 5/2017 | Han | G06K 19/07739 |

FOREIGN PATENT DOCUMENTS

| | | |
|---|---|---|
| ES | 2560089 | 2/2016 |
| FR | 2782817 | 3/2000 |
| FR | 2783622 | 3/2000 |
| JP | 2005128863 | 5/2005 |

OTHER PUBLICATIONS

International Search Report and Written Opinion dated Feb. 27, 2020 in International Patent Application No. PCT/US2019/063683.
English language Abstract for FR2783622 published Mar. 24, 2000.
English language Abstract for CN1505215 published Jun. 16, 2004.
English language Abstract for CN2788405 published Jun. 14, 2006.
English language Abstract for ES2560089 published Feb. 17, 2016.
English language Abstract for FR2782817 published Mar. 3, 2000.
English language Abstract for JP2005128863 published May 19, 2005.

* cited by examiner

SOCKET INTERCONNECTOR FOR HIGH PAD COUNT MEMORY CARDS

PRIORITY CLAIM

This application claims priority to U.S. Provisional Patent Application No. 62/807,395 filed Feb. 19, 2019 entitled "SOCKET INTERCONNECTOR FOR HIGH PAD COUNT MEMORY CARDS", which application is incorporated herein in its entirety.

BACKGROUND

Figure 1:
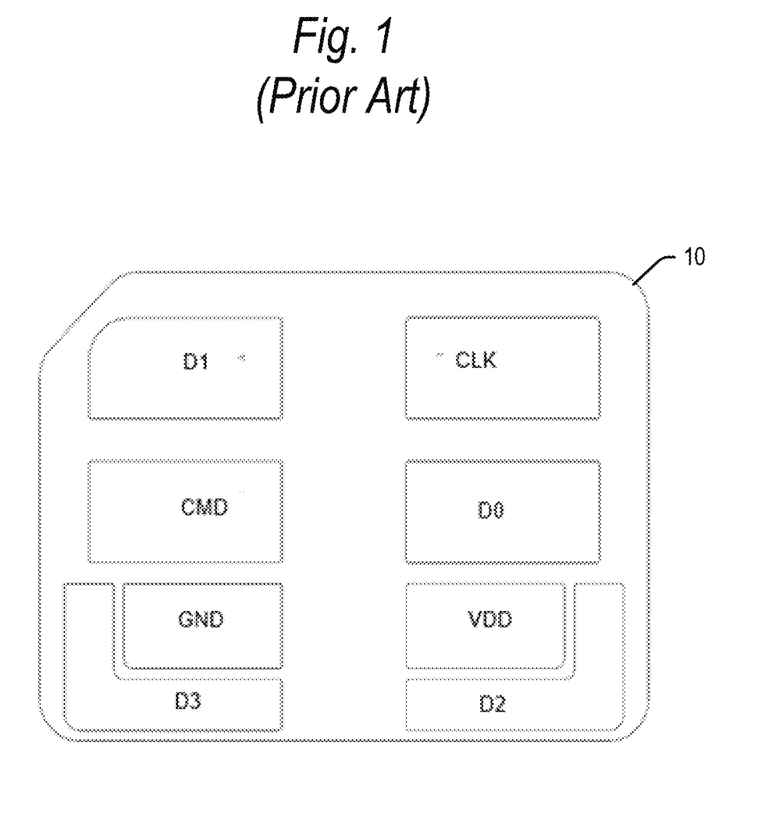
FIG. 1 is a view of a conventional nano MMC card.

For mobile devices such as smartphones, there is a growing demand to use multiple types of cards on a single device. For example, FIG. 1 shows a recently introduced nano Memory Card (NM Card, or nano MMC card hereafter) 10 having a Multimedia Card (MMC) interface. The NM Card 10 includes a pattern of contact pads in positions corresponding to positions of the pads of a nano SIM card. Push-eject card connectors exist with a pair of sockets to support different patterns of card installation. For example, a pair of nano SIM cards may be positioned within the card connector and used within a host device card socket. Alternatively, one nano MMC card and one nano SIM card may be positioned within the card connector and used within a host device card socket.

Figure 2A:
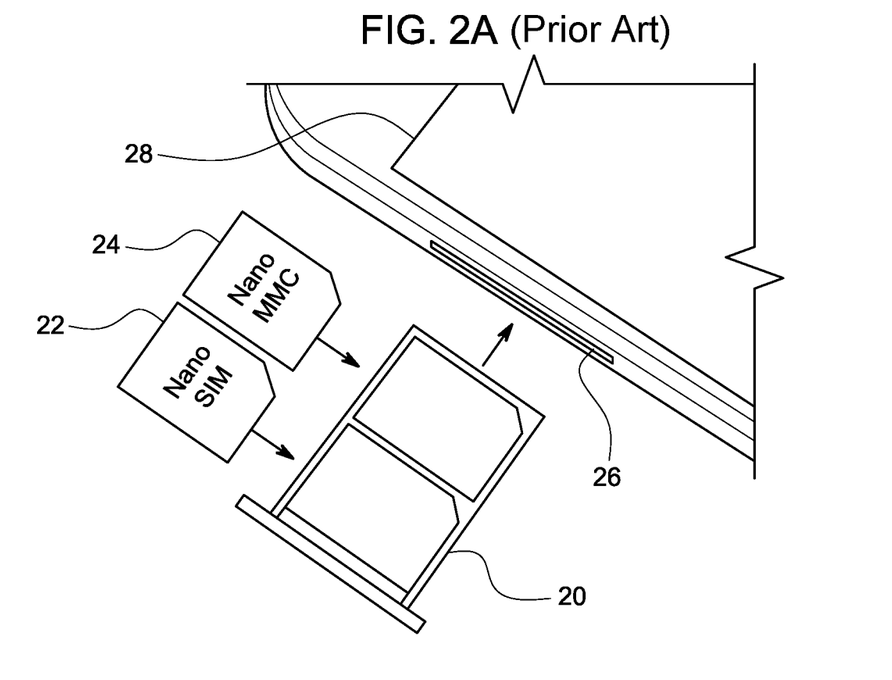
FIGS. 2A and 2B are views of conventional nano cards being inserted horizontally and vertically within a host device.
Figure 2B:
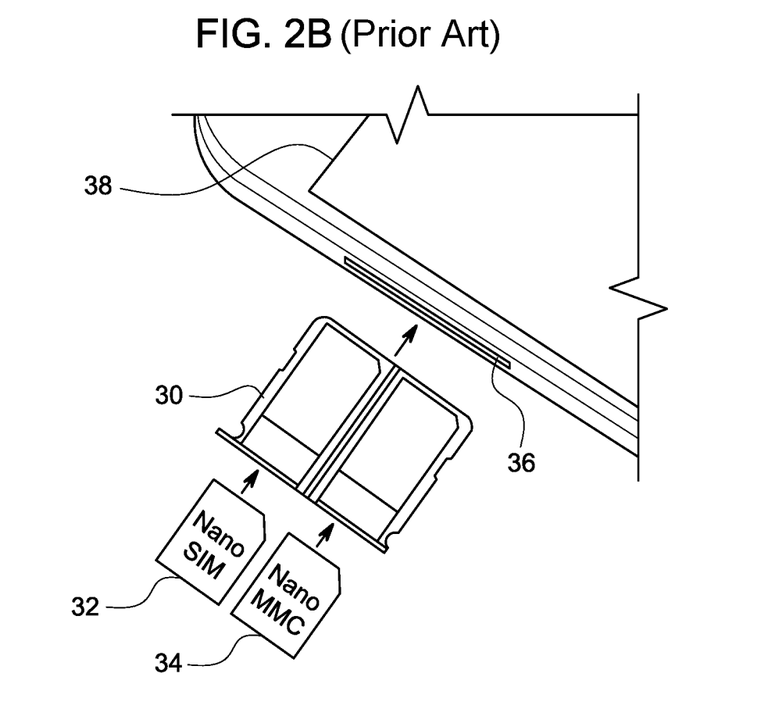

It is further known to configure card connectors and host card sockets with openings for horizontal or vertical insertion of memory cards. For example, FIG. 2A shows a conventional card connector 20 configured to receive a pair of memory cards, such as a nano SIM card 22 and a nano MMC card 24 in a horizontal orientation. Once inserted into the card connector 20, the connector and memory cards may be inserted into the socket 26 of a host device 28, such as a mobile telephone. FIG. 2B shows a conventional card connector 30 configured to receive a pair of memory cards, such as a nano SIM card 32 and a nano MMC card 34 in a vertical orientation. Once inserted into the card connector 30, the connector and memory cards may be inserted into the socket 36 of a host device 38, such as a mobile telephone. The host card socket 36 includes a configuration of contact pins that mate with the pads of the SIM card 32 and nano MMC card 34. The host card socket 36 includes a configuration of contact pins that mates with the same pads of the SIM card 32 and nano MMC card 34, rotated 90°.

As the number of pads on memory cards increase, it is becoming increasingly difficult to provide a pad configuration that will accurately and repeatedly mate with the pins inside a host socket. For example, some nano memory cards have been proposed operating according to the PCI Express (PCIe) bus interface. Such cards may include for example 18 contact pads. Given the large number of such pads in a small area, the pins in existing card sockets are not able to reliably connect with these pads.

DETAILED DESCRIPTION

The present technology will now be described with reference to the figures, which in embodiments, relate to a memory card socket interconnector. In embodiments, the socket interconnector includes a pair of cavities configured to receive a pair of memory cards. In embodiments, the memory cards may be a nano SD Express card and a nano SIM card, but the memory cards may be configured to other standards in further embodiments. The cavities are formed partially through the socket interconnector. A first (upper) surface within each of the cavities includes a set of memory card interconnect pads mirroring the size, shape and location of the contact pads on the respective memory cards. A second (lower) surface of the socket interconnector includes socket interconnect pads distributed across the second surface of the socket interconnector. The socket interconnect pads on the second surface are distributed over a wider area than the memory card interconnect pads on the first surface.

The socket interconnector may further include a redistribution layer between the first and second surfaces to electrically redistribute the memory card interconnect pads to the socket interconnect pads. The memory cards may be inserted into the cavities of the socket interconnector, with an anisotropic elastomeric sheet provided between the memory card pads and the memory card interconnect pads in each cavity. The elastomeric sheet enables good electrical contact between the memory card pads and the memory card interconnect pads. The socket interconnector may then be inserted into the socket of a host device.

The host device card socket may include a configuration of pins that match the positions of the socket interconnect pads, distributed across the second surface of the socket interconnector. Data and other signals may be exchanged between the memory cards and the host device through the socket interconnector and elastomeric sheets. Distributing the socket interconnect pads over a wider area than the memory card pads simplifies the design and implementation of the host device socket pins, and allows highly repeatable contact between the socket interconnect pads and host device socket pins.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top"/"bottom," "upper"/"lower" and "vertical"/"horizontal," and forms thereof, as may be used herein are by way of example and illustrative purposes only, and are not meant to limit the description of the technology in as much as the referenced item can be exchanged in position and orientation. Also, as used herein, the terms "substantially" and/or "about" mean that the specified dimension or parameter may be varied within an acceptable manufacturing tolerance for a given application.

Figure 3:
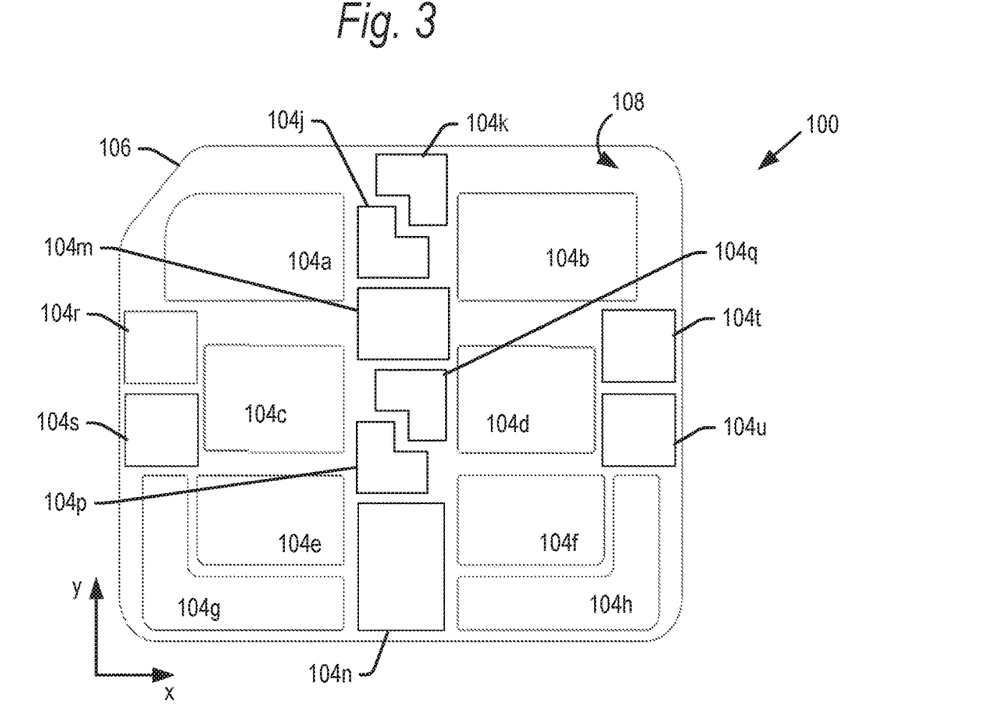
FIG. 3 is a bottom view of a nano SD Express card for use with an embodiment of the present technology.
Figure 4:
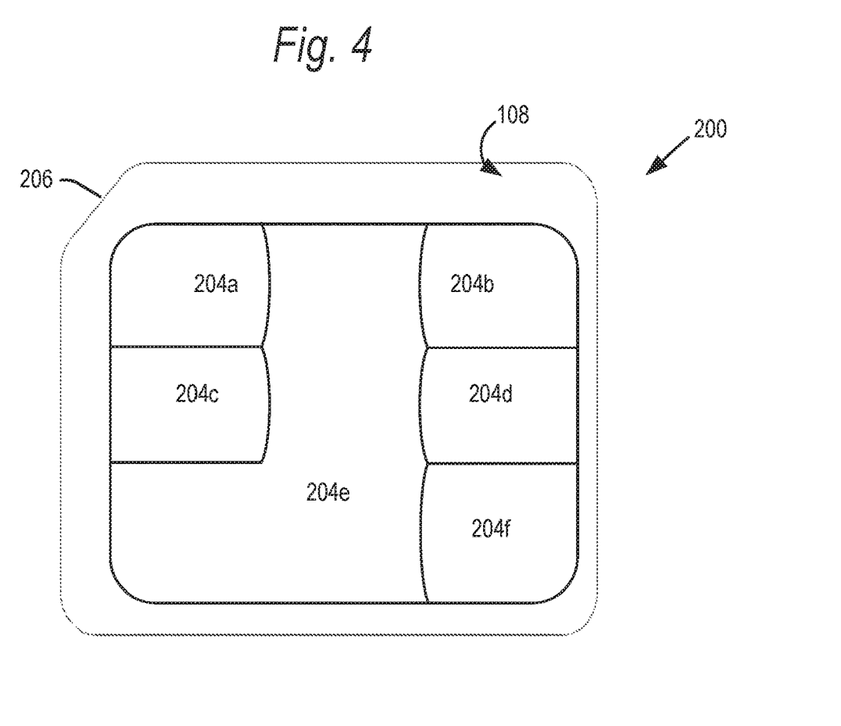
FIG. 4 is a bottom view of a nano SIM card for use with an embodiment of the present technology.

FIGS. 3 and 4 are views of bottom surfaces of a pair of memory cards 100 and 200 which may be used with the socket interconnector of the present technology. FIG. 3 is a view of a bottom surface 108 of a nano SD Express card 100. As noted, "bottom" and "top" are relative terms, and surface 108 may be a top side of card 100 (and card 200 described below) in further embodiments. The card 100 may have opposed planar surfaces (meaning at least a portion of the surfaces are planar). The card 100 may have the same form factor as a nano SIM card, with a length of 12.3 mm and a width of 8.8 mm. Other sizes are contemplated in further embodiments. The card 100 may include a corner chamfer 106 as in conventional nano SIM cards to define the orientation for insertion into a host device card socket.

The nano SD Express card 100 may include eighteen interface pads, numbered 104a-104u (collectively pads 104), configured with both the SD (or other such as MMC) bus interface and PCIe bus interface in a nano memory card form factor. The number of pads is sufficient so that there is full separation of the MMC/SD interface and the PCIe interface. It is understood that the number of pads 104 may be reduced to, for example, fourteen pads, in which case some of the signals of the MMC/SD interface and the PCIe interface share the same pads.

FIG. 3 shows one example of the configuration of pads 104 which allow the card 100 to be used in both horizontal and vertical host socket configurations. However, it is understood that the size, shape and position of the pads 104 in card 100 may be provided in a wide variety of other configurations while still supporting the MMC/SD interface and the PCIe interface in a nano memory card form factor. In further embodiments, the card 100 may include pads 104 for a PCIe nano memory card (without the SD or MMC functionality). Additionally, while embodiments of the memory card 100 are shown in the nano memory card form factor, it is understood that the memory card 100 may be in other shapes and sizes to support other standards in further embodiments.

FIG. 4 shows a bottom surface 108 of the memory card 200 including a pattern of pads 204a-204f (collectively pads 204) configured per the nano SIM standard. The SIM pads 204 shown in FIG. 4 are one example of specific SIM pads. Similar SIM functionality may be implemented in various pad patterns, as commonly done for various nano SIM cards.

While card 200 includes pads configured per the SIM bus interface, the card 200 may be configured for other bus standards, including for example for an MMC or SD card, or possibly a second PCIe card. Additionally, while embodiments of the memory card 200 are shown in the nano memory card form factor, it is understood that the memory card 200 may be in other shapes and sizes to support other standards in further embodiments. The card 200 may include a corner chamfer 206 to define the orientation for insertion into a host device card socket.

Figure 5:
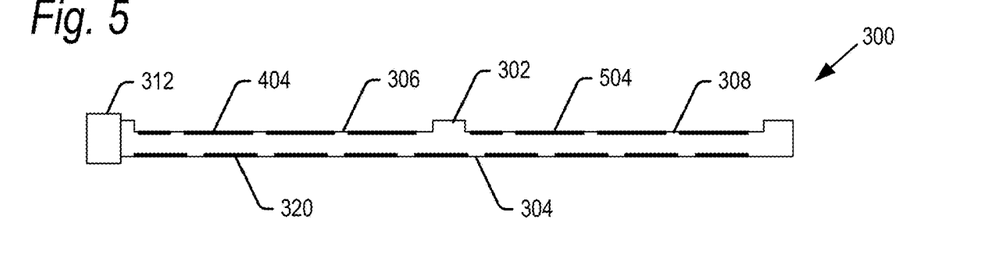
FIG. 5 is a cross-sectional edge view of a memory card socket interconnector according to an embodiment of the present technology.
Figure 6:
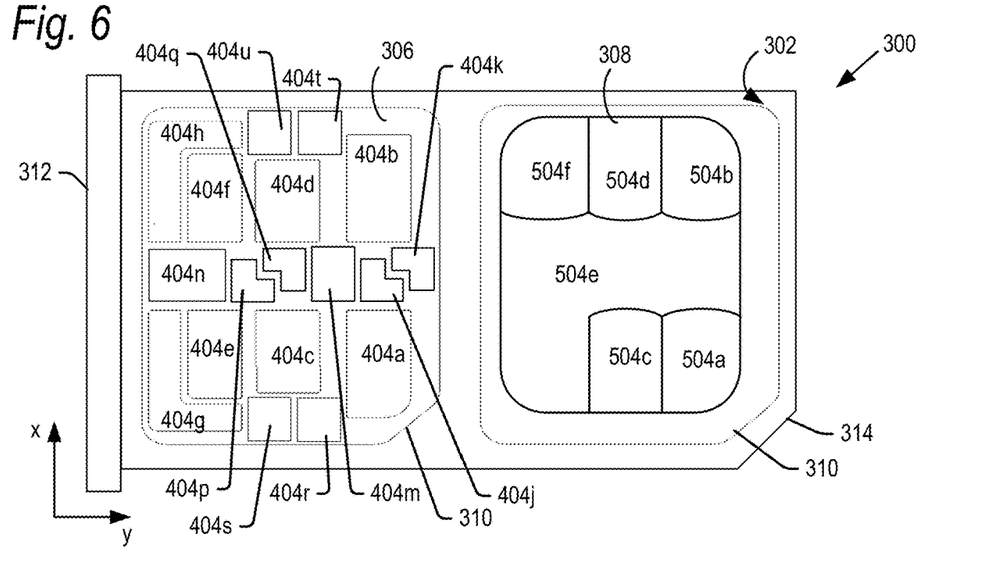
FIG. 6 is a top view of a memory card socket interconnector according to an embodiment of the present technology.
Figure 7:
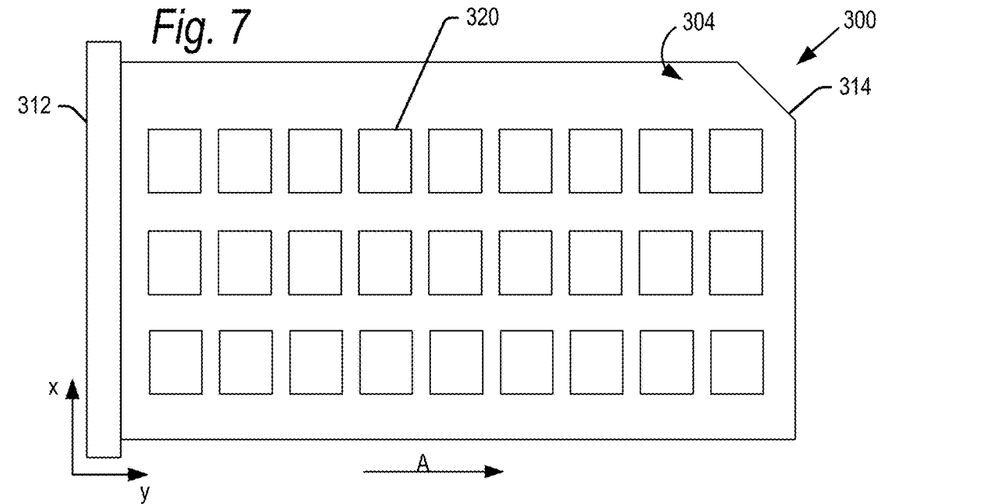
FIG. 7 is a bottom view of a memory card socket interconnector according to an embodiment of the present technology.

FIGS. 5, 6 and 7 show cross-sectional edge, top and bottom views, respectively, of a memory card socket interconnector 300 according to embodiments of the present technology. The socket interconnector 300 includes a top surface 302 (FIGS. 5 and 6) and a bottom surface 304 (FIGS. 5 and 7). In embodiments, the top surface 302 of the socket interconnector 300 includes a pair of cavities 306 and 308 configured to receive memory cards such as memory cards 100 and 200 described above.

In particular, cavity 306 is configured to receive memory card 100, which in embodiments, may be a nano SD Express card. In such embodiments, cavity 306 is provided with a number of memory card interconnect pads 404a-404u (collectively, pads 404). Memory card interconnect pads 404 are provided with sizes, shapes and positions so as to mirror the memory card pads 104. Thus, when memory card 100 is positioned within cavity 306, each of the memory card pads 104 will lie over its corresponding memory card interconnect pad 404 (memory card interconnect pad reference numbers are incremented by 300 relative to its corresponding memory card pad). In further embodiments, it is conceivable that there be more memory card interconnect pads 404 than there are memory card pads 104. It is also conceivable that the memory card pads 104 and the memory card interconnect pads 404 be different sizes and shapes, as long as the at least partially overlie each other.

Although it may differ in embodiments, in one example, the corresponding pads 104, 404 have the following functionalities. The pads 104a-104h/404a-404h may be SD interface pads, including for example data line D0 (pads 104d/404d), data line D1 (pads 104a/404a), data line D2 (pads 104h/404h) and data lines D3 (pads 104g/404g). Pads 104b/404b may carry a clock signal and pads 104c/404c may be a command/response line. Pads 104e/404e may be ground, and pads 104f/404f may be a voltage source VDD.

The pads 104j-104u/404j-404u may be PCIe interface pads. For example, the pads may include a pair of transmission line pads TX+ (104j/404j) and TX− (104k/404k), a pair of receiving line pads RX+ (104p/404p) and RX− 104q/404q), an additional voltage source line VDD2 (104n/404n)

and an optional additional ground pad GND (104*m*/404*m*). The pads may further comprise PCIe differential reference clock pads REFCLK+ (104*t*/404*t*) and REFCLK− (104*u*/404*u*), the PCIe clock request pad CLKREQ # (104*r*/404*r*) and side band signaling pad PERST # (104*s*/404*s*).

The above described functions of pads 104 and 404 is by way of example only. It is understood that the pads 104/404 may have different or other functions in further embodiments. Moreover, where a memory card 100 for use in cavity 306 had a different configuration of pads 104 from that described above, the configuration of pads 404 would change accordingly to match the pattern of pads 104.

Cavity 308 is configured to receive memory card 200, which in embodiments, may be a nano SIM card. In such embodiments, cavity 308 is provided with a number of memory card interconnect pads 504*a*-505*f* (collectively, pads 504). Memory card interconnect pads 504 are provided with sizes, shapes and positions so as to mirror the memory card pads 204 of card 200. Thus, when memory card 200 is positioned within cavity 308, each of the memory card pads 204 will lie over its corresponding memory card interconnect pad 504 (memory card interconnect pad reference numbers are incremented by 300 relative to its corresponding memory card pad). In further embodiments, it is conceivable that there be more memory card interconnect pads 504 than there are memory card pads 204. It is also conceivable that the memory card pads 204 and the memory card interconnect pads 504 be different sizes and shapes, as long as the at least partially overlie each other.

Although it may differ in embodiments, in one example, the corresponding pads 204, 504 have the following functionalities. The pads may include I/O pad (204*a*/504*a*), clock signal pad (pads 204*b*/504*b*), voltage Vpp pad (pads 204*c*/504*c*), reset pad (pads 204*d*/504*d*), ground pad (pads 204*e*/504*e*) and voltage source Vcc (pads 204*f*/504*f*). The above described functions of pads 204 and 504 is by way of example only. It is understood that the pads 204/504 may have different or other functions in further embodiments. Moreover, where a memory card 200 for use in cavity 308 had a different configuration of pads 204 from that described above, the configuration of pads 504 would change accordingly to match the pattern of pads 204.

The cavities 306, 308 may be provided to a depth such that, when the memory cards are loaded into the cavities, together with any elastomeric sheet as explained below, an upper surface of the memory cards may be flush with, or slightly above, the top surface 302, such that the memory cards and interconnect are fit snugly (top to bottom) within the socket of a host device. It is understood that the configuration of pads 404 and 504 in cavities 306 and 308 may be switched, so that cavity 308 receives memory card 100 and cavity 306 receives memory card 102.

The cavities 306 and 308 may have a perimeter shape matching that of cards 100 and 200, with one corner having diagonal profile 310 for receiving chamfers 108, 208 to ensure the cards 100, 200 are properly inserted within cavities 306, 308. The memory card socket interconnector 300 may further include finger grip 312 to facilitate insertion of the interconnector 300 into a memory card socket as explained below. The interconnector 300 may further include a chamfer 314 to ensure proper insertion of the interconnector 300 into the host device socket.

FIGS. 5 and 7 show a bottom surface 304 of interconnector 300 including a number of socket interconnect pads 320 (one of which is numbered in each of FIGS. 5 and 7). Interconnect pads 320 may be distributed (evenly or unevenly) across at least a majority of the bottom surface 304. In one embodiment, the pads 320 may each have a length (along the x-axis) of 2 mm and a width (along the y-axis) of 1.5 mm, with a spacing between each pad 320 of 0.5 to 2 mm. These dimensions and spacing between pads is by way of example only and may vary in further embodiments. There may be at least as many socket interconnect pads 320 on surface 304 as there are memory card interconnect pads 404, 504 on surface 302. As explained hereinafter, the memory card interconnect pads 404, 504 on surface 302 may be electrically connected and electrically redistributed to socket interconnect pads 320.

Figure 8:
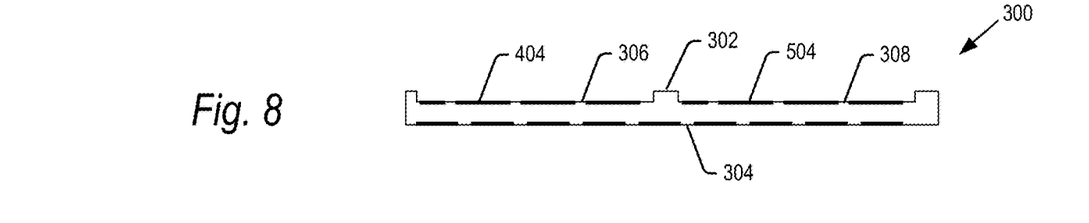
FIG. 8 is a cross-sectional edge view of a memory card socket interconnector according to an alternative embodiment of the present technology.
Figure 9:
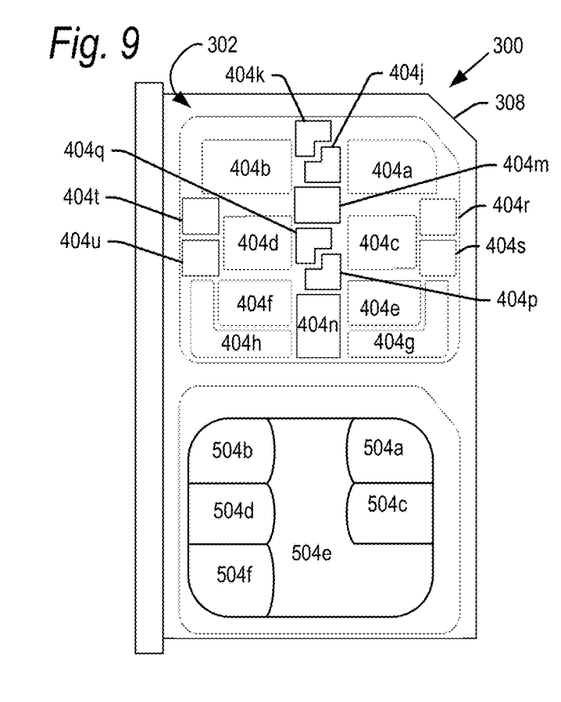
FIG. 9 is a top view of a memory card socket interconnector according to an alternative embodiment of the present technology.
Figure 10:
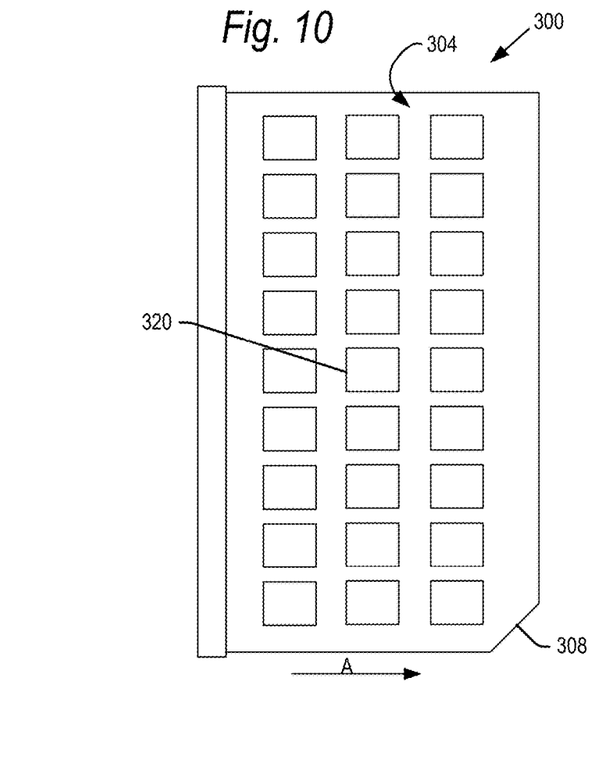
FIG. 10 is a bottom view of a memory card socket interconnector according to an alternative embodiment of the present technology.

The embodiment of the memory card socket interconnector 300 shown in FIGS. 5-7 is configured for horizontal insertion of memory cards 100 and 200 into a host device socket in the direction of arrow A (FIG. 7). FIGS. 8-10 show an alternative embodiment of the memory card socket interconnector 300 configured for vertical insertion of memory cards 100 and 200 into a host device socket in the direction of arrow A (FIG. 10). The embodiment of interconnector 300 shown in FIGS. 8-10 may be generally the same as that shown in FIGS. 5-7, including cavities 306 and 308 configured as described above to receive memory cards 100 and 200 (rotated 90°). As above, cavity 306 includes memory card interconnect pads 404 as the mirror image of memory card pads 104, and cavity 308 includes memory card interconnect pads 504 as the mirror image of memory card pads 204. The socket interconnect pads 320 shown in FIGS. 8-10 may be the same as socket interconnect pads 320 shown in FIGS. 5-7 (rotated 90°).

Figure 11:
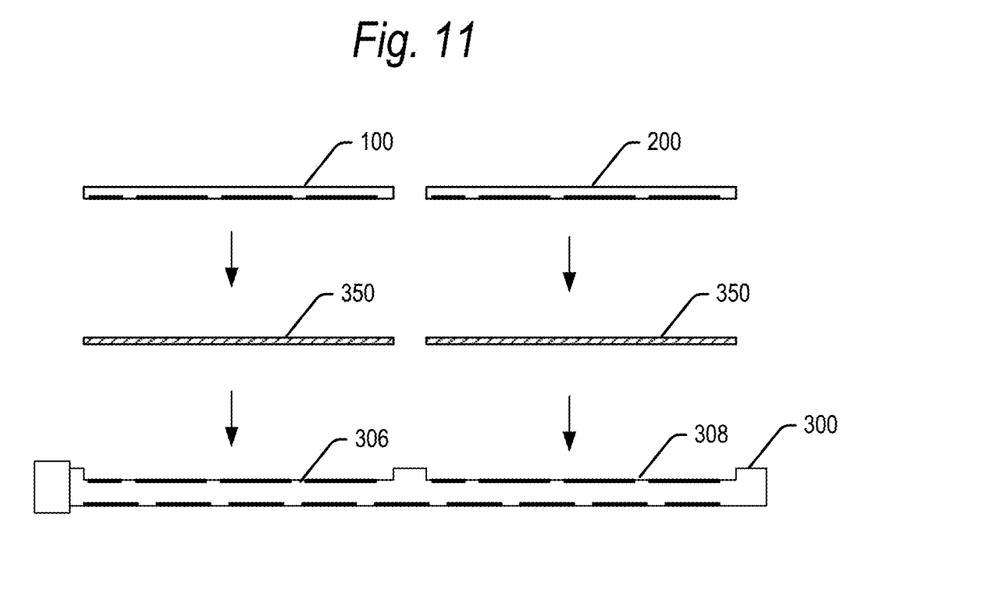
FIG. 11 is a cross-sectional edge view showing the loading of memory cards into the memory card socket interconnector according to embodiments of the present technology.

FIG. 11 is a cross-sectional edge view illustrating the loading of memory cards 100, 200 into the memory card socket interconnector 300. In particular, in order to facilitate good electrical contact between the memory card pads 104, 204 and the memory card interconnect pads 404, 504, an anisotropic conductive film such as anisotropic elastomeric sheet 350 may first be placed within each of the cavities 306 and 308. Thus, upon loading the memory cards, the elastomeric sheet 350 is sandwiched in between respective memory cards 100, 200 and the memory card socket interconnector 300.

Figure 12:
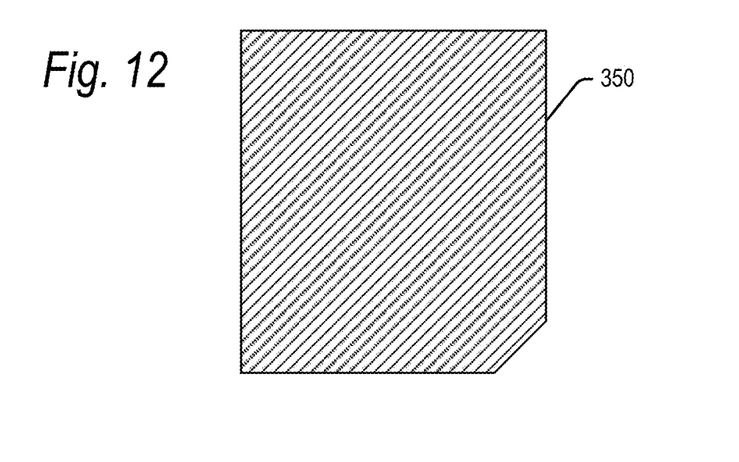
FIG. 12 is a top view of an anisotropic elastomeric sheet for use in embodiments of the present technology.

Elastomeric sheet 350 may be adapted from known anisotropic elastomeric materials, such as the "matrix series," commercially available from Tespro Co., LTD., Tokyo, Japan. However, in general, elastomeric sheet 350 is comprised of strands of interwoven material, where each strand includes fine pitch metal wire coils wrapped around the strand. FIG. 12 shows a top view of one of the anisotropic elastomeric sheet 350. As shown, the sheet 350 may be cut to match the footprint of the memory cards 100, 200 and cavities 306, 308.

Figure 13A:
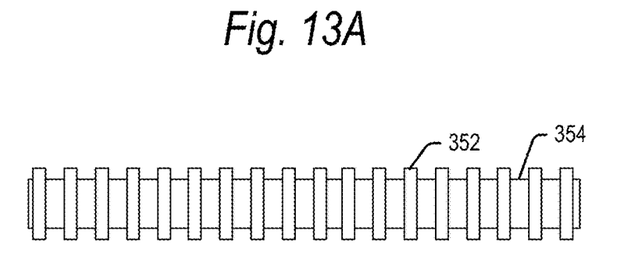
FIGS. 13A and 13B are enlarged views of a first embodiment of an anisotropic elastomeric sheet for use in embodiments of the present technology.
Figure 13B:
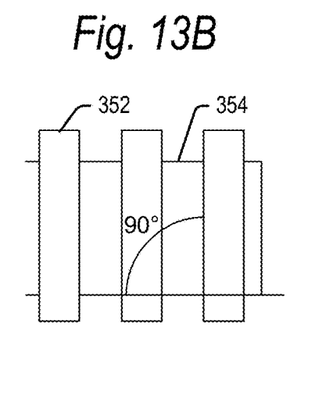
Figure 14A:
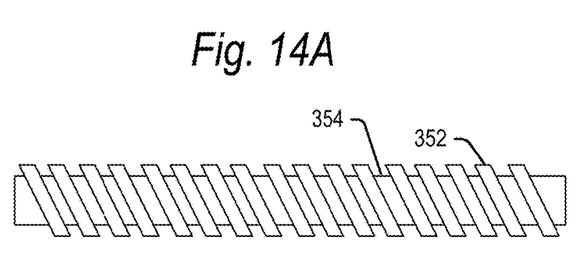
FIGS. 14A and 14B are enlarged views of a second embodiment of an anisotropic elastomeric sheet for use in embodiments of the present technology.
Figure 14B:
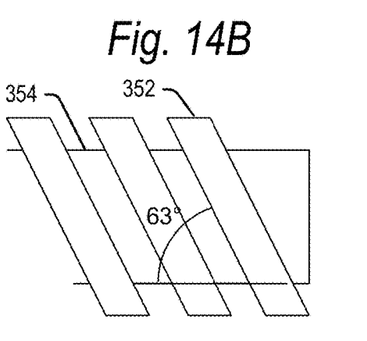
Figure 15A:
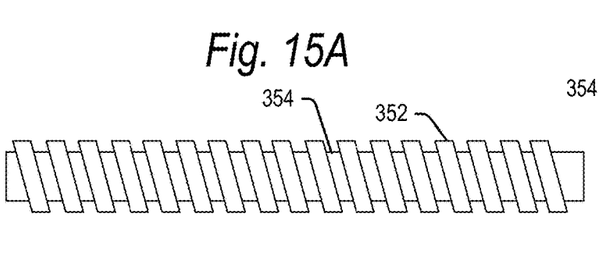
FIGS. 15A and 15B are enlarged views of a third embodiment of an anisotropic elastomeric sheet for use in embodiments of the present technology.
Figure 15B:
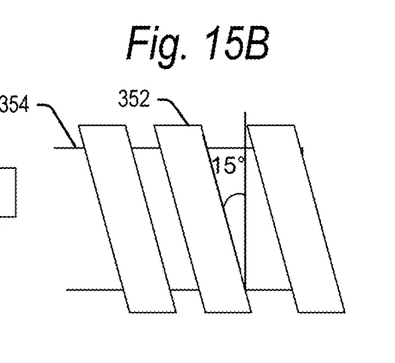

FIGS. 13A-15B illustrate different examples of elastomeric sheets 350. FIGS. 13A-13A illustrate a "matrix-90" elastomeric sheet, where a metal wire 352 may be wrapped around a strand 354 such that the wire 352 forms a 90° angle with the strand 354. FIGS. 14A-14B illustrate a "matrix-63" elastomeric sheet, where a metal wire 352 may be wrapped around a strand 354 such that the wire 352 forms a 63° angle with the strand 354. FIGS. 15A-15B illustrate a "matrix-15" elastomeric sheet, where a metal wire 352 may be wrapped around a strand 354 such that the wire 352 forms a 15° angle with a plane normal to the strand 354. It is understood that the wire 352 may form other angles with respect to the strand 354 in further embodiments.

In embodiments, the metal wire 352 may have a thickness ranging between 0.15 mm and 2 mm, and a pitch between metal loops ranging between 0.04 mm and 0.1 mm. These thicknesses and pitches are by way of example only, and may vary in further embodiments.

The elastomeric sheets 350, and in particular the metal wire coils 352, are compressible in a plane normal to the sheets 350. When a sheet 350 is sandwiched between a memory card 100, 200 and the card socket interconnector 300, and a force is applied, multiple metal coils 352 get compressed between the memory card pads 104, 204 and the memory card interconnect pads 404, 504. Thus, the anisotropic elastomeric sheets 350 facilitate good electrical contact between respective memory card pads 104, 204 and the memory card interconnect pads 404, 504 when the memory cards 100, 200 are pressed into the cavities 306, 308, as when the interconnector 300 is inserted into a socket of a host device as explained below.

While the elastomeric sheets facilitate good electrical contact, it is conceivable that the elastomeric sheets be omitted in further embodiments. In such embodiments, the memory card pads 104, 204 may rest directly against the memory card interconnect pads 404, 504. Thus, as used herein, the memory card pads 104, 204 mate with the memory card interconnect pads 404, 504. This mating may be indirect, as where an elastomeric sheet 350 is provided therebetween. Alternatively, this mating may be direct, as where there is no elastomeric sheet or other compressible conductor therebetween, and the pads 104, 204 lie in direct physical contact with the pad 404, 504.

Figure 16:
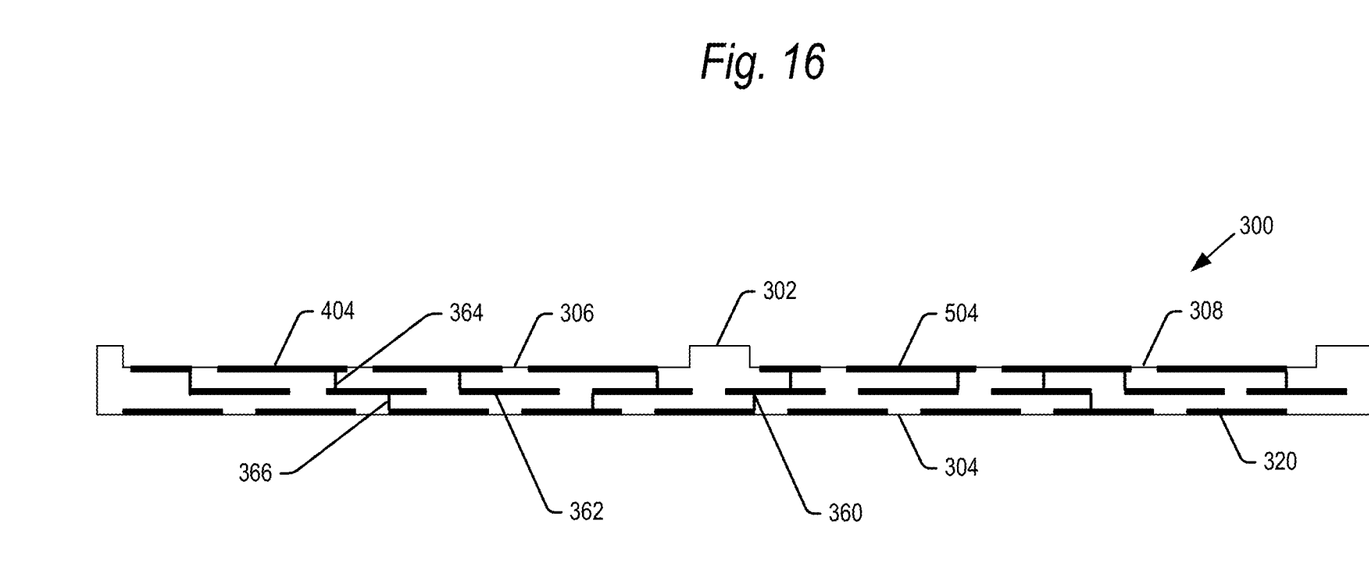
FIG. 16 is a cross-sectional edge view of a memory card socket interconnector showing the redistribution layer according to an embodiment of the present technology.

As noted above, the memory card interconnect pads 404, 504 on surface 302 of interconnector 300 may be electrically connected and electrically redistributed to socket interconnect pads 320 on surface 304. Referring now to the cross-sectional edge view of FIG. 16, the socket interconnector 300 may further include a redistribution layer 360 between the top and bottom surfaces 302, 304. The redistribution layer 360 electrically interconnects the memory card interconnect pads 404, 504 and the socket interconnect pads 320. The redistribution layer 360 may comprise an etched conductive pattern 362 residing in one or more planes between the top and bottom surfaces 302, 304. The redistribution layer 360 may further include, a first series of vias 364 extending between the memory card interconnect pads 404, 504 and the etched conductive pattern 362, and a second series of vias 366 extending between the socket interconnect pads 320 and the etched conductive pattern 362.

As noted in the Background section, the large number of memory card contact pads in a small area, for example as in a nano SD Express Card, presents problems with respect to reliable and repeatable contact with these pads by pins within a host socket. This problem is solved in the present technology by the interconnector 300. The interconnector 300 effectively redistributes the large number of contact pads from the small area of the nano card footprint to the larger area of the bottom surface of the interconnector 300.

Figure 17:
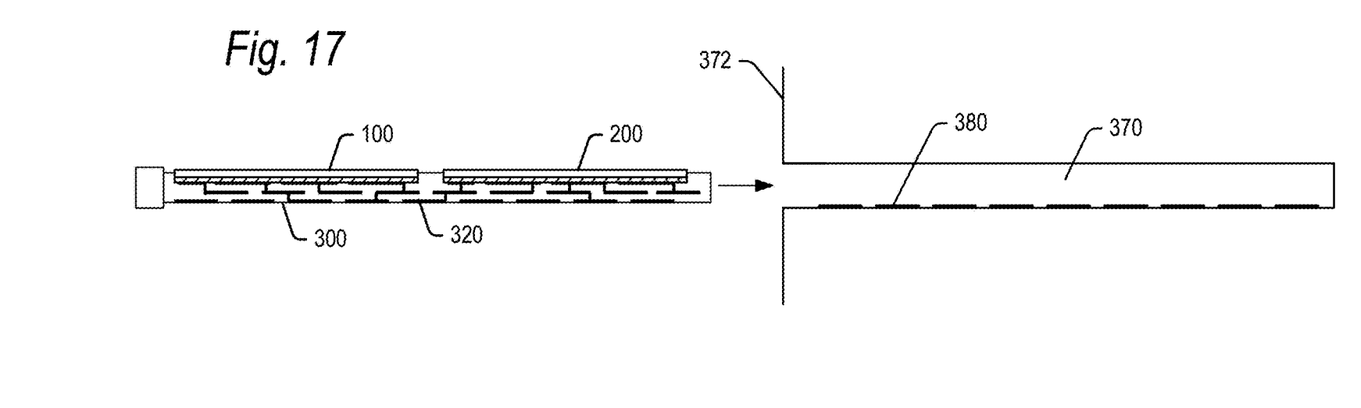
FIG. 17 is a cross-sectional edge view of a memory card socket interconnector supporting a pair of memory cards as they are being inserted into a host device socket.

FIG. 17 is a cross-sectional edge view showing a memory card socket interconnector 300 being inserted into a socket 370 of a host device 372. The host device 372 may for example be a mobile telephone, but may be a variety of other computing devices in further embodiments, such as for example desktop computers, laptop computers, tablets, automotive computing systems, cameras and a wide variety of other devices utilizing a removable non-volatile memory.

As shown in FIG. 17, the memory cards 100 and 200 been loaded into the memory card socket interconnector 300 in preparation for loading the interconnector 300 into the socket 370. As shown in the cross-sectional edge view of FIG. 17 and the top view of FIG. 18, a pattern of socket pins 380 may be provided in a bottom surface of the socket 370.

Figure 18:
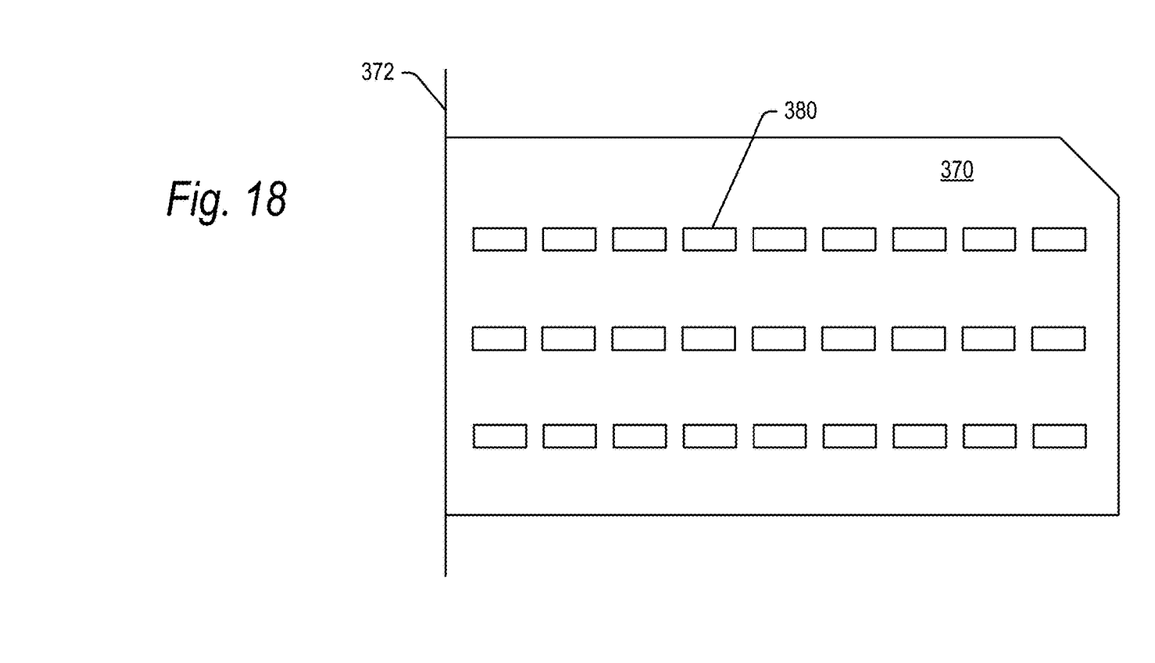
FIG. 18 is a top view of a configuration of pins within the socket of a host device for mating with pads on a bottom surface of the interconnector.

Socket pins 380 may be provided in a pattern matching that of the socket interconnect pads 320 on the bottom surface of the interconnector 300. Thus, the socket pins 380 may electrically contact each of the socket interconnect pads 320 (or at least those pads 320 electrically coupled to a memory card interconnect pad 404, 504) upon insertion of the interconnector 300 in the socket 370.

The socket 370 may be sized or otherwise provided with mechanisms to ensure a tight fit (top to bottom) of the interconnector 300 and memory cards 100, 102 in the socket 370. This facilitates good mating between the memory card pads 104, 204 and the memory card interconnect pads 404, 504. This also facilitates good electrical coupling between the socket interconnect pads 320 and the socket pins 380.

Embodiments described above show an interconnector 300 supporting a pair of memory cards 100, 200. However, in further embodiments, the interconnector 300 may support a single memory card, such as memory card 100. In this case, the memory card socket interconnect 300 have a smaller footprint. However, in such embodiments, as in the embodiments described above, the interconnector 300 effectively redistributes the contact pads 104 of memory card 100 over a larger area of the bottom surface of the interconnector 300. This redistribution enables a more reliable and repeatable contact with these pads by pins within a host socket than is possible where the socket pins are confined to the footprint of the memory card.

In summary, in one embodiment, the present technology relates to a memory card socket interconnector configured to support one or more memory cards in a socket of a host device, the memory card socket interconnector comprising: a set of memory card interconnect pads on a first surface of the memory card socket interconnector, the set of memory card interconnect pads configured to mate with pads on the one or more memory cards; a set of socket interconnect pads on a second surface of the memory card socket interconnector opposite the first surface, the set of socket interconnect pads configured to mate with pins within the socket of the host device, wherein the set of socket interconnect pads are spaced from each other by a greater amount than at least some of the set of memory card interconnect pads on the first surface; and a redistribution layer between the first and second surfaces electrically redistributing the set of memory card interconnect pads to the set of socket interconnect pads.

In another embodiment, the present technology relates to a memory card socket interconnector configured to support one or more memory cards in a socket of a host device, the memory card socket interconnector comprising: a set of memory card interconnect pads on a first surface of the memory card socket interconnector, the set of memory card interconnect pads having a pattern mirroring a pattern of pads on the one or more memory cards; an electrical conductor configured to be positioned between the set of memory card interconnect pads on the first surface of the memory card socket interconnector and the pads on the one or more memory cards to facilitate good physical and electrical contact between the set of memory card interconnect pads on the first surface of the memory card socket interconnector and the pads on the one or more memory cards; a set of socket interconnect pads on a second surface of the memory card socket interconnector opposite the first surface, the set of socket interconnect pads configured to mate with pins within the socket of the host device, wherein the set of socket interconnect pads are spaced from each other by a greater amount than at least some of the set of memory card interconnect pads on the first surface; and a redistribution layer between the first and second surfaces electrically redistributing the set of memory card interconnect pads to the set of socket interconnect pads.

In another embodiment, the present technology relates to a memory card socket interconnector configured to support a pair of memory cards in a socket of a host device, the memory card socket interconnector comprising: a first cavity formed in a first surface of the memory card socket interconnector, the first cavity comprising a first set of memory card interconnect pads, the first set of memory card interconnect pads configured to mate with pads of a first memory card having a PCIe interface positioned within the first cavity; a second cavity in the first surface of the memory card socket interconnector, the second cavity comprising a second set of memory card interconnect pads, the second set of memory card interconnect pads configured to mate with pads of a second memory card positioned within the second cavity; a set of socket interconnect pads on a second surface of the memory card socket interconnector opposite the first surface, the set of socket interconnect pads configured to mate with pins within the socket of the host device; and a redistribution layer between the first and second surfaces electrically redistributing the first and second sets of memory card interconnect pads to the set of socket interconnect pads.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A memory card socket interconnector configured to support first and second memory cards in a socket of a host device, the memory card socket interconnector comprising:
   a first set of memory card interconnect pads in a first pattern on a first surface of the memory card socket interconnector, the first set of memory card interconnect pads configured to mate with pads on the first memory card;
   a second set of memory card interconnect pads in a second pattern on the first surface of the memory card socket interconnector, the second set of memory card interconnect pads configured to mate with pads on the second memory card;
   a set of socket interconnect pads on a second surface of the memory card socket interconnector opposite the first surface, the set of socket interconnect pads configured to mate with pins within the socket of the host device, the set of socket interconnect pads distributing the first and second patterns of memory card interconnect pads from the first surface to the second surface, and the socket interconnect pads being spaced from each other by a greater amount than at least some of the first set of memory card interconnect pads on the first surface; and
   a redistribution layer between the first and second surfaces electrically redistributing the first and second sets of memory card interconnect pads to the set of socket interconnect pads.

2. The memory card socket interconnector of claim 1, wherein the first memory card is configured for a PCI Express (PCIe) interface, the first set of memory card interconnect pads mirroring a configuration of the pads on the first memory card.

3. The memory card socket interconnector of claim 2, wherein the second memory card comprises pads for at least one of a PCIe interface, a SIM interface, an SD interface and a Multimedia Card (MMC) interface.

4. The memory card socket interconnector of claim 1, further comprising at least one anisotropic conductive elastomeric sheet on at least one of the first and second sets of memory card interconnect pads.

5. The memory card socket interconnector of claim 4, wherein portions of the at least one anisotropic elastomeric sheet are configured to be compressed upon one of the first and second memory cards being compressed against the at least one anisotropic elastomeric sheet.

6. The memory card socket interconnector of claim 1, further comprising:
   an electrical conductor configured to be positioned between at least one of the first and second sets of memory card interconnect pads on the first surface of the memory card socket interconnector and the pads on at least one of the first and second memory cards, the electrical conductor configured to be compressed by the pads on the at least one of the first and second memory cards to facilitate good physical and electrical contact between the at least one set of memory card interconnect pads on the first surface of the memory card socket interconnector and the pads on the at least one of the first and second memory cards.

7. The memory card socket interconnector of claim 6, wherein the electrical conductor comprises one or more sheets of electrically conductive material.

8. A memory card socket interconnector configured to support first and second memory cards in a socket of a host device, the memory card socket interconnector comprising:
   a first cavity formed in a first surface of the memory card socket interconnector configured to receive the first memory card and having a size and shape matching a size and shape of the first memory card, the first cavity comprising a first set of memory card interconnect pads, the first set of memory card interconnect pads having a first pattern configured to mate with pads of the first memory card having a PCI Express (PCIe) interface positioned within the first cavity;
   a second cavity formed in the first surface of the memory card socket interconnector configured to receive the second memory card and having a size and shape matching a size and shape of the second memory card, the second cavity comprising a second set of memory card interconnect pads, the second set of memory card interconnect pads having a second pattern configured to mate with pads of the second memory card positioned within the second cavity;
   a set of socket interconnect pads on a second surface of the memory card socket interconnector opposite the first surface, the set of socket interconnect pads having a third pattern of evenly spaced interconnect pads evenly distributing the first and second patterns of memory card interconnect pads from the first surface; and
   a redistribution layer between the first and second surfaces electrically redistributing the first and second sets of memory card interconnect pads to the set of socket interconnect pads.

9. The memory card socket interconnector of claim 8, wherein the set of socket interconnect pads are spaced from each other by a greater amount than at least some of the memory card interconnect pads of the first and second sets of memory card interconnect pads.

10. The memory card socket interconnector of claim 8, wherein the first set of memory card interconnect pads mirror a configuration of the pads on the first memory card having a PCIe interface.

11. The memory card socket interconnector of claim 8, wherein the second memory card comprises pads for one of a PCIe interface, a SIM interface, an SD interface and a Multimedia Card (MMC) interface.

12. The memory card socket interconnector of claim 11, wherein the second set of memory card interconnect pads mirror a configuration of the pads on the second memory card.

13. The memory card socket interconnector of claim 8, further comprising an electrical conductor configured to fit in or on the first cavity, between the first set of memory card interconnect pads and the pads on the first memory card, to facilitate good physical and electrical contact between the first set of memory card interconnect pads and the pads on the first memory card.

14. The memory card socket interconnector of claim 13, wherein the electrical conductor comprises a sheet of electrically conductive material.

15. The memory card socket interconnector of claim 13, wherein the electrical conductor comprises an anisotropic elastomeric sheet.

16. The memory card socket interconnector of claim 13, wherein the electrical conductor comprises a first electrical conductor, the memory card socket interconnector further comprising a second electrical conductor configured to fit in or on the second cavity, between the second set of memory card interconnect pads and the pads on the second memory card, to facilitate good physical and electrical contact between the second set of memory card interconnect pads and the pads on the second memory card.

17. A memory card socket interconnector configured to support first and second memory cards in a socket of a host device, the memory card socket interconnector comprising:
   a first cavity formed in a first surface of the memory card socket interconnector configured to receive the first memory card and having a size and shape matching a size and shape of the first memory card, the first cavity comprising first memory card interconnect means for mating with pads of the first memory card having a PCI Express interface positioned within the first cavity;
   a second cavity formed in the first surface of the memory card socket interconnector configured to receive the second memory card and having a size and shape matching a size and shape of the second memory card, the second cavity comprising second memory card interconnect means for mating with pads of the second memory card positioned within the second cavity;
   socket interconnect means on a second surface of the memory card socket interconnector opposite the first surface, the socket interconnect means for evenly distributing the first and second memory card interconnect means from the first surface to the second surface; and
   redistribution means, between the first and second surfaces, for electrically redistributing the first and second memory card interconnect means to the socket interconnect means.

* * * * *